United States Patent [19]
Burns et al.

[11] Patent Number: 5,917,970
[45] Date of Patent: Jun. 29, 1999

[54] WAVELENGTH MULTIPLEXED, ELECTRO-OPTICALLY CONTROLLABLE, FIBER OPTIC MULTI-TAP DELAY LINE

[75] Inventors: William K. Burns, Alexandria, Va.; Leslie E. Chipman, Waldorf; Robert P. Moeller, Fort Washington, both of Md.

[73] Assignee: The United States of America as represented by the Secretary of the Navy, Washington, D.C.

[21] Appl. No.: 09/063,269

[22] Filed: Apr. 21, 1998

[51] Int. Cl.[6] ............................ G02B 6/28; H04J 14/08
[52] U.S. Cl. .................... 385/24; 385/3; 359/140
[58] Field of Search .................. 385/24, 3, 9; 359/124, 359/127, 133, 138, 139, 140

[56] References Cited

U.S. PATENT DOCUMENTS

| | | | |
|---|---|---|---|
| 4,809,256 | 2/1989 | Smith et al. | 359/140 |
| 4,956,834 | 9/1990 | Coleman | 359/123 |
| 4,991,975 | 2/1991 | Alfgerness et al. | 359/139 |
| 5,367,586 | 11/1994 | Glance et al. | 385/24 |
| 5,442,474 | 8/1995 | Huang et al. | 359/139 |
| 5,546,483 | 8/1996 | Inoue et al. | 385/14 |
| 5,559,910 | 9/1996 | Taga et al. | 385/24 |
| 5,703,708 | 12/1997 | Das et al. | 359/140 |
| 5,870,213 | 2/1999 | Ishikawa et al. | 359/135 |

OTHER PUBLICATIONS

Yegnan Arayanan et al.; Recirculating Photonic Filter: A wavelength–selective time delay for phased–array antennas and wavelength code–division multiple access; optics ltrs, vol. 21, No. 10, pp. 740–742, May 1996.

Matsumoto et al; Microwave Phase Shifter Using Optical Waveguide Structure; J. Lightwave Tech, vol. 9, No. 11, pp. 1523–1527, Nov. 1991.

*Primary Examiner*—Hemang Sanghavi
*Attorney, Agent, or Firm*—Thomas E. McDonnell; Charles J. Stockstill

[57] ABSTRACT

The wavelength multiplexed, electro-optically controllable, fiber optic multi-tap delay line utilizes a first output signal from a plurality of amplitude adjustable continuous-wave (CW) optical lasers multiplexed to form a combined optical signal onto which a radio frequency signal is imposed thereby shifting the combined optical signal which is then demultiplexed. A second output signal of the plurality of CW lasers is phase adjusted and combined with the demultiplexed combined optical signal to form a RF phase adjusted modulated optical signal. The plurality of phase adjusted modulated optical signals pass through associated optical delay lines and are multiplexed to form a single optical signal containing a plurality of optical channels having different characteristics which is applied to a detector to produce an output electrical signal for transmission to using devices.

13 Claims, 2 Drawing Sheets

WAVELENGTH MULTIPLEXED, ELECTRO-OPTICALLY CONTROLLABLE, FIBER OPTIC MULTI-TAP DELAY LINE

BACKGROUND OF THE INVENTION

1. Field of the Invention

This invention pertains generally to optical delay lines and more particularly to an optical delay line where electro-optical control of microwave amplitude and phase is applied to each individual tap in a fiber optic multi-tap delay line.

2. Description of the Related Art

Fiber optic multi-tap delay lines are in a developmental stage for electronic applications. Multi-tap delay lines split a optical signal into many paths which are delayed relative to each other, modulated in amplitude and phase, and then recombined. The term multi-tap delay lines can also refer to transversal filters since they can be used to implement finite impulse response (FIR) filter designs. Compared to other technologies, such as micro-strip delay lines, fiber optics offers some distinct advantages such as lower loss and significantly higher bandwidths.

Current fiber optic delay lines use a radio frequency (RF) signal to amplitude modulate an optical carrier, typically using a directly modulated laser. The optical carrier is then split into multiple fiber path lengths (taps), each tap is then separately detected and recombined. Single sideband or vector modulators may then be used to modify the RF spectrum of each tap before it is recombined. The electrical components to detect, modulate and combine the taps is fairly large in size and high in power consumption.

SUMMARY OF THE INVENTION

The object of this invention is to provide an unlimited array of high speed optical delay lines operating in the millimeter wavelengths on a device of small size and with a low power consumption.

This and other objectives are accomplished with the wavelength multiplexed, electro-optically controllable, fiber optic multi-tap delay line based upon use of a plurality of Mach-Zehnder interferometers having a common first arm and independent second arms. The output from a plurality of amplitude adjustable continuous-wave (CW) optical lasers of different wavelengths is divided into a first and second output signal thereby forming the arms of the plurality of Mach-Zehnder interferometers. The output optical signals from the plurality of lasers forming the first arm of the Mach-Zehnder interferometer are multiplexed to form a combined optical signal onto which a radio frequency (RF) or microwave electrical signal is superimposed in a Mach-Zehnder interferometer thereby shifting the frequency of the combined optical signals. The frequency shifted combined first optical signals are then demultiplexed to form a plurality of frequency shifted optical signals, one for each of the plurality of lasers. The plurality of second output signals from the plurality of lasers forming the second arm of each of the plurality of Mach-Zehnder interferometers are individually phase adjusted and mixed with the now demultiplexed frequency adjusted first optical signals to form a plurality of frequency shifted/RF or microwave phase adjusted optical signals. Each optical signal of the plurality of frequency shifted/RF or microwave phase adjusted optical signals passes through an associated optical delay lines having a predetermined delay and is wavelength multiplexed to form a single phase shifted/frequency adjusted optical signal containing a plurality of optical channels having different characteristics which is applied to a detector to produce an output electrical signal for transmission to using devices.

DESCRIPTION OF THE PREFERRED EMBODIMENT

Figure 1:
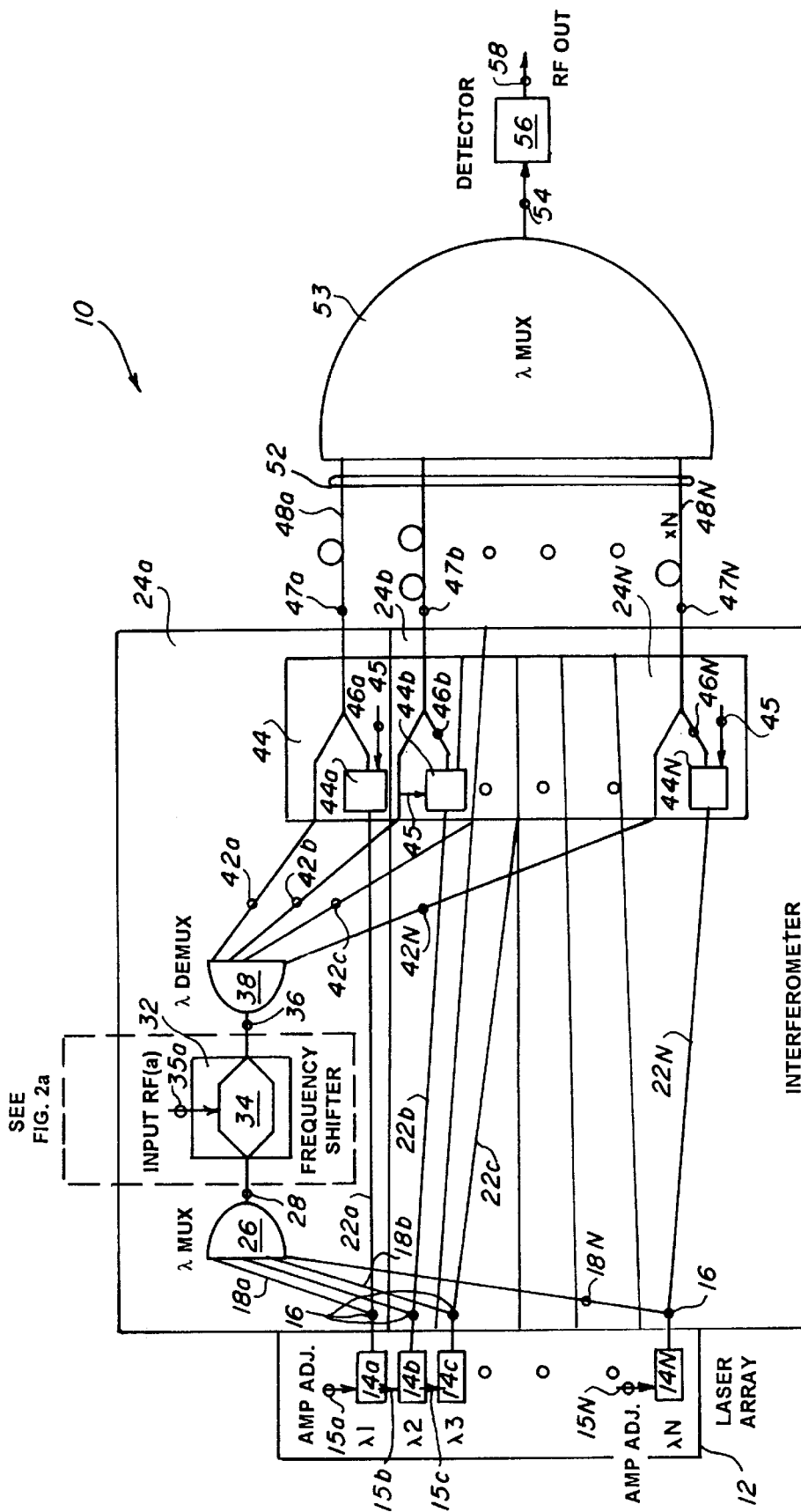
FIG. 1 shows a wavelength multiplexed multi-tap delay line.

The wavelength multiplexed, electro-optically controllable, fiber optic multi-tap delay line 10, shown in FIG. 1, is formed by, preferably N channel highly coherent, solid state, narrow-band, laser array 12 providing N separate optical output wavelengths, one for each desired channel. The lasers 14a-N forming the laser array 12 may have individual modulators (not shown) or they may be continuous-wave (CW) lasers. The lasers 14a-N do not have to be tunable because the N lasers forming the laser array 12 may each be set to a separate wavelength. The output amplitude of each laser 14a-N in the laser array 12 may be adjusted individually by drive current adjustment 15a-N, respectively, for each channel. The specific type of laser is irrelevant, it may be semi-conductor or any other type of highly coherent laser. The output of each laser 14 in the laser array 12 is divided by optical fiber couplers 16a-n, into a first and second optical signal, 18 and 22, respectively, forming the inputs to N interferometers 24a-N, one for each desired channel.

The optical signals 18 from all laser sources 14 are applied to a wavelength multiplexer 26, of a type well known to those skilled in the art. Here the optical signals 18a-N are combined in the multiplexer 26 to form a multiplexed first optical signal 28 which is applied to a microwave frequency shifter 32.

Figure 2A:
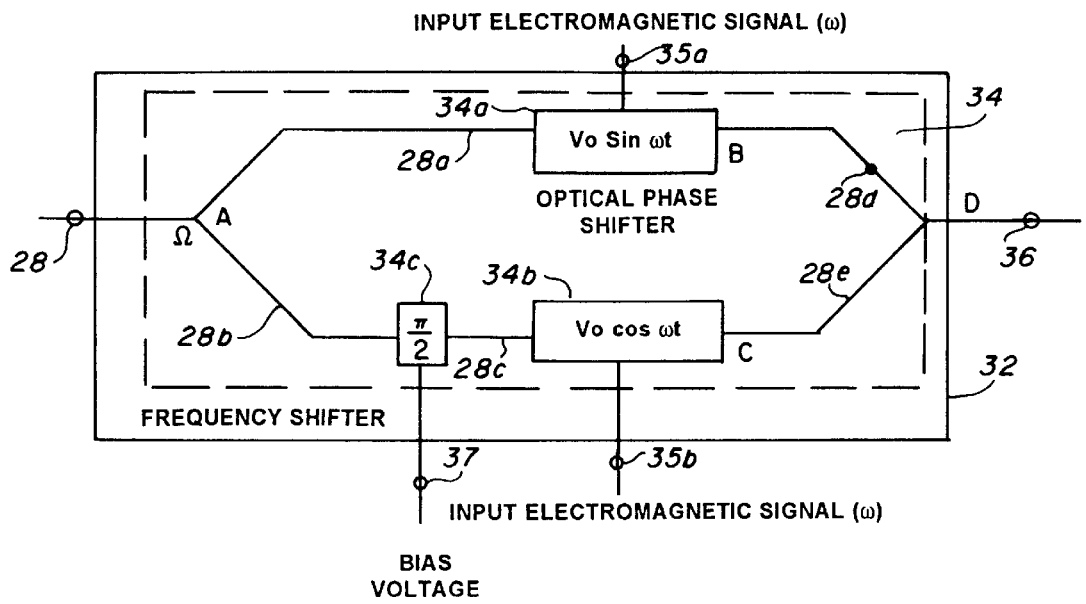
FIG. 2a shows a typical microwave frequency shifter.
Figure 2B:
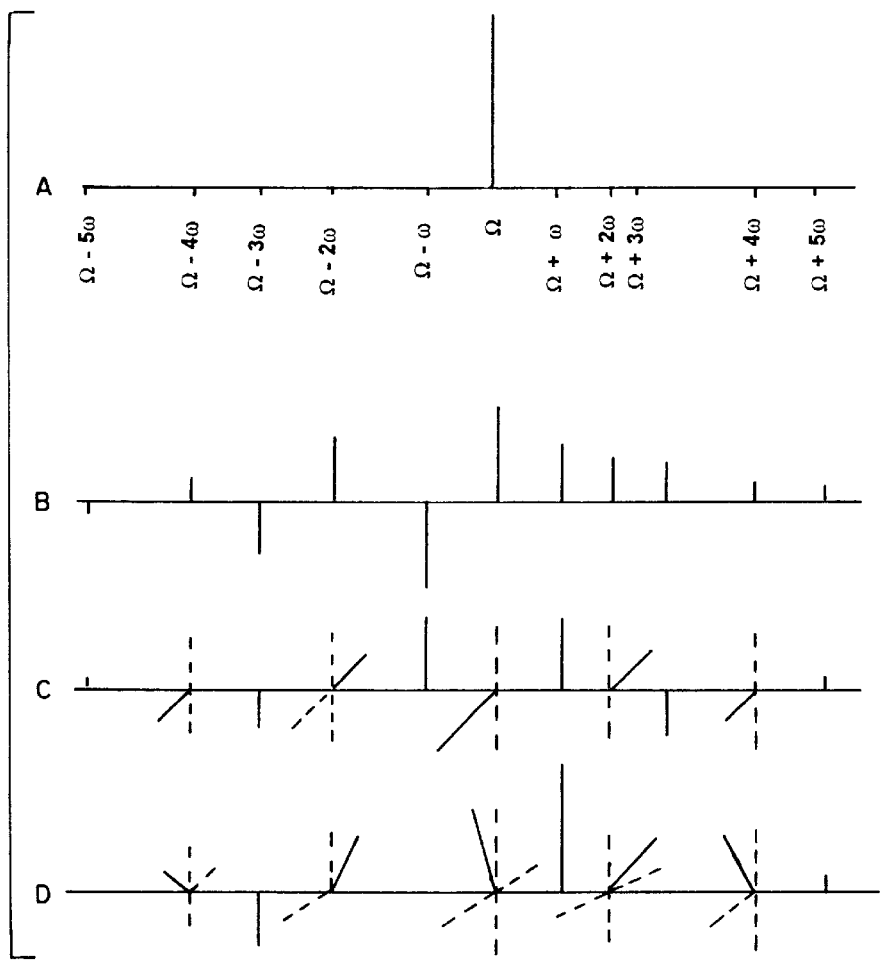
FIG. 2b shows the frequency spectra at the corresponding points A–D.

Referring now to FIGS. 2a and 2b, the frequency shifter 32 is nominally comprised of a Mach-Zehnder interferometer 34, where an input microwave (RF) signal 35a and 35b is used to frequency shift multiplexed optical signal 28, of optical frequency $\Omega$, by techniques well known to those skilled in the art. The multiplexed optical signal 28 is split in Mach-Zehnder interferometer 34 into two signals 28a and 28b and a Hilbert transform, or quadrature splitter, as depicted by the optical phase shifters 34a and 34b, is utilized to apply the sine and cosine component 35a and 35b, respectively, of the input microwave (RF) signal to the optical signals 28a and 28b, respectively. (A direct current, or bias voltage 37 is applied to the optical signal 28b in optical phase shifter, $-\pi/2$, 34c shifting the phase of the optical signal 28b by 90° prior to the output optical signal 28c being applied to optical phase shifter 34b.) The sine component ($V_o \sin\omega t$) 35a of the RF signal is superimposed on optical signal 28a in optical phase shifter 34a. The cosine component ($V_o \cos\omega t$) 35b of the RF signal is superimposed on optical signal 28c in an optical phase shifter 34b. (It is to be noted that RF or microwave signals 35a and 35b are derived from the same RF signal source.) $V_o$ is that amplitude of the input rf signal which is split into the sine and cosine components of the input RF or microwave signals 35a and b, respectively. When the phase modulated optical outputs 28d and 28e of the optical phase shifters 34a and 34b are mixed to form the combined phase shifted optical signal 36, the RF or microwave signal, $\omega$, 35a and 35b is superimposed on the multiplexed optical signals 28a and 28b so that the frequency of the input multiplexed optical signal 28 is shifted by ω.

The frequency spectrum for the optical frequency shifter 32 is shown in FIG. 2b for the points A–D shown in FIG. 2a. A is the input spectrum, the single input frequency Ω, B–D are the other tones that become present because of the input RF or microwave signals 35a and b. The spectrum of the modulated light 28d at the output of the optical phase shifter 34a is given by B. In the second arm of the Mach-Zehnder interferometer 34, the optical signal 28c is modulated by the optical phase shifter 34b with the modulating signal $V_o\cos\omega t$, and at the same time a static quarter-wave phase retardation is given by the dc voltage 37 applied at the optical phase shifter 34c. The optical spectrum from the optical phase shifter 34b is shown as the spectrum C. In this case, the $+1^{st}$-order sideband component of the spectra B and C are in phase mutually and those of the $-1^{st}$ order are 180° out of phase. The final output, D, is the superposition of these two output signals so that the $-1^{st}$ order is canceled out, and the $+1^{st}$ order is restored. The combined output optical light 36 (modulated optical signals 28d and 28e) from the optical frequency shifter 32 contains higher frequency components, which causes a harmonic distortion of the output. It is to be noted that the vertical and tilted lines indicate these other spectrum higher frequency components that are present and the angle of tilt indicates the relative phase. If it is desired to suppress these higher harmonic distortions, electrical filtering to the output signal 36 may be used. D is a single sideband frequency shifted optical signal 36 obtained when the signals at B and C are combined at D. See, Matsumoto et al., Microwave Phase Shifter Using Optical Waveguide Structure, J. of Lightwave Tech, Vol. 9, No. 11, pp. 1523–1527, Nov. 1991; which is hereby incorporated by reference in total.

Referring again to FIG. 1, the optical frequency shifted multiplexed optical signal 36 is then applied to a demultiplexer 38 that produces N frequency shifted optical signals 42, one for each channel. The second optical signals 22a-N from the couplers 16 form the second leg of the interferometers 24a-N. The optical signals 22a-N may be individually optically phase shifted for each laser 14 channel. This is accomplished by passing each optical signal 22a-N through an associated electro-optic phase shifter 44a-N, thereby forming a plurality of phase adjusted optical signals 46a-N which are then mixed with the associated frequency shifted optical signals 42a-N. Preferably the phase shifter 44 is an electrode structure that superimposes an electrical signal across the waveguide formed on a LiNbO$_3$ substrate, however other techniques may be used. This technique is well known to those skilled in the art. The associated frequency shifted optical signal 42a-N and phase adjusted optical signals 46a-N combine at the output of the interferometers 24a-N to form a plurality of frequency shifted optical signals 47a-N with electro-optical control of the RF or microwave phase through the optical phase shifters 44a-N. These optical signals 47a-N are then applied to an associated optical delay lines 48a-N forming a plurality of optical delay lines 52, one associated with each optical channel, and each optical delay line 48a-N having a varying optical fiber length.

The plurality of discrete optical delay lines 52, preferably constructed with single mode optical fiber, apply the frequency shifted/phase adjusted optical signals 47a-N to a wavelength multiplexer 53 forming a combined frequency shifted/Rf or microwave phase adjusted optical signal 54. The combined optical signal 54 passes to a photodetector 56 where it is converted into an output RF signal 58 for processing by other devices, not shown. The photodetector 56 is a device well known to those skilled in the art and the only requirement for such a device is that it have a high frequency response capability.

This invention satisfies the requirement for low voltage electro-optic control of microwave amplitude and phase for a multi-tap fiber optic delay line. Electro-optic rather than electric control of the microwave phase is obtained, with savings in component size, power consumption and speed. This approach allows for optical recombination, which can be done at higher frequencies than electrical recombination. The only frequency constraint is on the optical frequency shifter 32 and the detector. The wavelength multiplexed implementation has an optical power advantage of a factor $N^2$ over the non-multiplexed implementation. The wavelength multiplexer 53 has no intrinsic recombination loss. All optical fibers are single mode optical fibers of a type well known to those skilled in the art.

Using different wavelength lasers 14 for each channel allows amplitude adjustment directly at each laser 14, by adjusting the laser drive current. Alternatively an array of amplitude adjustment interferometers could be used for channel amplitude adjustment, because each channel is driven by a separate laser 14. When the tap signals are combined in the output multiplexer 53 the optical signals will be incoherent since they originate from different lasers, as they should be for proper summation. Thus coherence problems between the taps is avoided.

Preferably the wavelength multiplexer 53 is quartz waveguide on silicon substrate formed on a SiO$_2$/Si wafer with the frequency shifter 32 and the plurality of phase shifters 44 formed using lithium niobate integrated optics technology. In the low frequency section of the device 10 the plurality of phase shifters 44, delay lines 52, and wavelength multiplexer 53 may be formed on a polymer waveguide/Si substrate for use with frequencies in the microwave region or millimeter wave portion of the spectrum. For use with frequencies at the lower frequencies in the RF spectrum, where longer delays are required it is recognized that optical fibers must be used to connect the plurality of optical phase shifters 44 with the wavelength multiplexer 53.

Although the invention has been described in relation to an exemplary embodiment thereof, it will be understood by those skilled in the art that other variations and modifications can be affected in the preferred embodiment without detracting from the scope and spirit of the invention as set forth in the claims.

What is claimed is:

1. An optical delay line comprised of:

means for producing a first and second optical signal from a plurality of optical channels;

means for combining the first optical signals of the plurality of optical channels to produce a combined optical signal;

means for frequency shifting the combined optical signal to produce a combined frequency shifted optical signal having a single sideband;

means for individually adjusting the phase of each second optical signal of each channel of the plurality of optical channels to produce an optically phase shifted signal for each channel;

means for applying the combined frequency shifted optical signal to the optically phase shifted optical signal for each channel to obtained a frequency shifted/ optically phase shifted optical signal for each channel of the plurality of optical channels;

a plurality of optical fibers, each fiber of a predetermined length for an associated optical channel, receiving said frequency shifted/optically phase shifted optical signal for the associated channel and delaying the frequency shifted/optically phase shifted optical signal a predetermined amount;

means for combining the, selectively delayed, frequency shifted/optically phase shifted optical signals from the plurality of optical channels to produce a combined, selectively delayed, frequency shifted/optically phase shifted optical signal; and means for converting the combined, selectively delayed, frequency shifted/optically phase shifted optical signal into an electrical signal.

2. A wavelength multiplexed, electro-optically controllable, fiber-optic multi-tap delay line comprised of:

means for producing a plurality of optical signals from a plurality of optical signal sources, each optical signal associated with a specific optical channel;

means for producing a first and second optical signal, said first and second optical signal forming a first and second leg of an optical interferometer;

means for combining the first optical signals associated with each optical channel to form a combined first optical signal;

means for frequency shifting the combined first optical signal, of the optical signal sources forming the first leg of the optical interferometer, to form a combined frequency shifted optical signal having a single sideband;

means for optically phase shifting the second optical signal of each optical channel, said optically phase shifted optical signal forming the second leg of the interferometer associated with each optical channel;

means for combining the frequency shifted optical signal and optically phase shifted optical signal to produce a frequency shifted/phase adjusted optical signal associated with each optical channel;

an optical fiber forming an optical delay line associated with each optical channel receiving the frequency shifted/optically phase shifted optical signal of an associated optical channel, said optical fiber being of a different length for each optical channel;

means for combining the frequency shifted/optically phase shifted signal each optical channel, to form an combined frequency shifted/optically phase shifted signal; and means for converting the combined frequency shifted/ optically phase shifted signal into an electrical signal for application to a using device.

3. A wavelength multiplexed, electro-optically controllable, fiber optic multi-tap delay line, as in claim 2, wherein the means for producing a plurality of optical signals is a laser.

4. A wavelength multiplexed, electro-optically controllable, fiber optic multi-tap delay line, as in claim 2, wherein the means for producing a first and second optical signal is an optical frequency coupler.

5. A wavelength multiplexed, electro-optically controllable, fiber optic multi-tap delay line, as in claim 2, wherein the means for combining the first optical signals associated with each optical channel to form a combined first optical signal is a wavelength multiplexer.

6. A wavelength multiplexed, electro-optically controllable, fiber optic multi-tap delay line, as in claim 2, wherein the means frequency shifting the combined first optical signal is an optical frequency shifter.

7. A wavelength multiplexed, electro-optically controllable, fiber optic multi-tap delay line, as in claim 2, wherein the means for separating the combined frequency shifted optical signal into a frequency shifted optical signal associated with each optical channel forming the first leg of the interferometer is an wavelength demultiplexer.

8. A wavelength multiplexed, electro-optically controllable, fiber optic multi-tap delay line, as in claim 2, wherein the means for phase adjusting the second optical signal is an optical phase adjuster.

9. A wavelength multiplexed, electro-optically controllable, fiber optic multi-tap delay line, as in claim 2, wherein the optical fiber forming the delay line associated with each optical channel is a single mode optical fiber.

10. A wavelength multiplexed, electro-optically controllable, fiber optic multi-tap delay line, as in claim 2, wherein the means for combining the frequency shifted/ optically phase shifted signal of each optical channel, to form an combined frequency shifted/optically phase shifted signal is a wavelength multiplexer.

11. A wavelength multiplexed, electro-optically controllable, fiber optic multi-tap delay line, as in claim 2, wherein the means for converting the combined frequency shifted/optically phase shifted signal into an electrical signal is a photodetector.

12. A wavelength multiplexed, electro-optically controllable, fiber optic multi-tap delay line comprised of:

a plurality of optical signal sources forming a plurality of optical signal channels;

an optical coupler associated with each optical signal source dividing said source into a first and second optical signal forming a first and second leg of an interferometer associate with each optical signal channel;

a wavelength multiplexer combining each first optical signal from the plurality of optical signal sources producing a single multiplexed optical signal;

a frequency shifter receiving said multiplex optical signal and producing a frequency shifted multiplexed optical signal said frequency shifted multiplexed optical signal forming the first leg of the interferometer;

means for wavelength demultiplexing said frequency shifted multiplexed optical signal to produce a plurality of frequency shifted optical signals, each signal being associated with an specific optical channel;

a phase adjuster for adjusting the phase of the second optical signal to produce a phase adjusted optical signal forming the second leg of the interferometer, said frequency shifted optical signals and said optically phase adjusted optical signals combining at an output of the interferometer to form a frequency shifted/ optically phase shifted signal for each channel;

a length of optical fiber forming an optical delay line associated with each channel, said optical fiber being of a different length for each channel, receiving the frequency shifted/optically phase shifted signal of the associated channel;

a wavelength multiplexer receiving the optical output of each channel and producing a combined frequency shifted/optically phase shifted output signal; and means for converting the combined frequency shifted/ optically phase shifted output signal into an electrical signal for application to an associated user device.

13. A method for wavelength multiplexing, electro-optically controlling, a fiber optic multi-tap delay line comprising the steps of:

producing a first and second optical signal from a plurality of optical channels;

combining the first optical signals of the plurality of optical channels to produce a combined optical signal;

frequency shifting the combined optical signal to produce a combined frequency shifted optical signal having a single sideband;

individually adjusting the phase of each second optical signal of each channel of the plurality of optical channels to produce an optically phase shifted signal for each channel;

applying the combined frequency shifted optical signal to the optically phase shifted optical signal for each channel to obtained a frequency shifted/optically phase shifted signal for each channel of the plurality of optical channels;

transmitting said plurality of frequency shifted/optically phase shifted signals through a plurality of optical fibers, each fiber of a predetermined length for an associated optical channel, selectively delaying the frequency shifted/optically phase shifted signal a predetermined amount;

combining the, selectively delayed, frequency shifted/optically phase shifted optical signals from the plurality of optical channels to produce a combined, selectively delayed, frequency shifted/optically phase shifted optical signal; and converting the combined, selectively delayed, frequency shifted/optically phase shifted optical signal into an electrical signal.

\* \* \* \* \*